United States Patent
Hermey et al.

(10) Patent No.: US 11,600,981 B2
(45) Date of Patent: Mar. 7, 2023

(54) STRAIN RELIEF FOR QUICK ASSEMBLY FOR A CABLE CARRIER

(71) Applicant: igus GmbH, Cologne (DE)

(72) Inventors: Andreas Hermey, Hennef (DE); Ralf Steeger, Lohmar (DE); Thilo-Alexander Jaeker, Sankt Augustin (DE); Bilal Yilmaz, Cologne (DE)

(73) Assignee: IGUS GMBH, Cologne (DE)

( * ) Notice: Subject to any disclaimer, the term of this patent is extended or adjusted under 35 U.S.C. 154(b) by 65 days.

(21) Appl. No.: 16/604,255

(22) PCT Filed: Apr. 10, 2018

(86) PCT No.: PCT/EP2018/059164
§ 371 (c)(1),
(2) Date: Oct. 10, 2019

(87) PCT Pub. No.: WO2018/189182
PCT Pub. Date: Oct. 18, 2018

(65) Prior Publication Data
US 2020/0161847 A1      May 21, 2020

(30) Foreign Application Priority Data
Apr. 10, 2017   (DE) ..................... 20 2017 102 147.5

(51) Int. Cl.
*H02G 15/007*    (2006.01)
*F16G 13/16*    (2006.01)
(Continued)

(52) U.S. Cl.
CPC ........... *H02G 15/007* (2013.01); *F16G 13/16* (2013.01); *F16L 3/1066* (2013.01); *F16L 3/1075* (2013.01);
(Continued)

(58) Field of Classification Search
CPC ...... H02G 15/007; H02G 15/013; H02G 3/22; H02G 3/32; H02G 3/081; H02G 11/006;
(Continued)

(56) References Cited

U.S. PATENT DOCUMENTS

| 2,348,096 A | * | 5/1944 | Schack | .................. | F16L 3/227 |
| | | | | | 248/68.1 |
| 3,175,262 A | | 3/1965 | Wilson | | |

(Continued)

FOREIGN PATENT DOCUMENTS

| CN | 203352072 | 12/2013 |
| DE | 2417353 | 10/1975 |

(Continued)

OTHER PUBLICATIONS

Search report from corresponding German Appln. No. 20 2017 102 147.5, dated Jan. 9, 2018.
(Continued)

*Primary Examiner* — Jonathan Liu
*Assistant Examiner* — Taylor Morris
(74) *Attorney, Agent, or Firm* — Grossman, Tucker, Perreault & Pfleger, PLLC

(57) ABSTRACT

A tension relief for a cable carrier. A multi-part holding frame comprising bars which are connected by side parts holds block-like spacers, between which a plurality of lines, such as cables, hoses or the like, are laid. In order to exert a clamping force by the holding frame on the spacers for the purpose of strain relief, a quickly closable device is provided. A quick release clamp can be provided, which in the closed position clamps the side parts and/or the bars to one another. According to the invention, the two side parts are mounted pivotably on the lower strip and are fastened releasably to the first bar, for example by screws or the quick release clamp. Each side part can thus be pivoted from the
(Continued)

closed position into an open position and vice versa in order to release and clamp the lines respectively.

8 Claims, 4 Drawing Sheets

(51) Int. Cl.
  *F16L 3/10* (2006.01)
  *F16L 3/22* (2006.01)
  *H02G 3/32* (2006.01)
  *H02G 11/00* (2006.01)
  *H02G 3/22* (2006.01)

(52) U.S. Cl.
  CPC .................. *F16L 3/22* (2013.01); *H02G 3/32* (2013.01); *H02G 11/006* (2013.01); *H02G 3/22* (2013.01)

(58) Field of Classification Search
  CPC ..... H02G 3/263; H02G 3/0475; F16L 3/2235; F16L 3/227; F16L 55/035; F16L 3/18; F16L 3/015; F16L 3/1066; F16L 3/1075; F16L 3/22; F16G 13/16; F16G 13/18
  See application file for complete search history.

(56) References Cited

U.S. PATENT DOCUMENTS

| | | | | |
|---|---|---|---|---|
| 3,716,986 A * | 2/1973 | Cork | ................. | F16G 13/16 59/78.1 |
| 3,742,119 A * | 6/1973 | Newman | ................. | H02B 1/305 174/559 |
| 3,989,210 A * | 11/1976 | Berkman | ................. | F16L 3/23 248/73 |
| 4,108,527 A * | 8/1978 | Douty | ................. | H01R 13/627 439/465 |
| 4,202,457 A * | 5/1980 | Tansi | ................. | H02G 3/081 174/53 |
| 4,249,353 A * | 2/1981 | Berry | ................. | H02G 3/22 52/232 |
| 4,376,230 A * | 3/1983 | Bargsten | ................. | H02G 3/22 174/505 |
| 4,570,437 A * | 2/1986 | Moritz | ................. | H02G 11/006 59/78.1 |
| 4,626,233 A * | 12/1986 | Moritz | ................. | F16G 13/16 59/78.1 |
| 4,769,985 A * | 9/1988 | Moritz | ................. | H02G 11/006 248/68.1 |
| 4,800,714 A * | 1/1989 | Moritz | ................. | H02G 11/006 59/78.1 |
| 4,813,224 A * | 3/1989 | Blase | ................. | F16G 13/16 248/49 |
| 4,852,342 A * | 8/1989 | Hart | ................. | E21F 17/06 59/78.1 |
| 4,884,774 A * | 12/1989 | Rodi | ................. | H02G 3/22 248/68.1 |
| 4,902,855 A * | 2/1990 | Smith | ................. | G02B 6/4444 174/77 R |
| 4,919,372 A * | 4/1990 | Twist | ................. | H02G 3/22 248/68.1 |
| 5,048,283 A * | 9/1991 | Moritz | ................. | F16G 13/16 59/900 |
| 5,111,556 A * | 5/1992 | Dehling | ................. | G02B 6/4445 24/270 |
| 5,123,547 A | 6/1992 | Koch | | |
| 5,184,793 A * | 2/1993 | Heidt | ................. | H01R 13/52 174/153 G |
| 5,199,724 A * | 4/1993 | Meltsch | ................. | F16L 7/02 138/96 R |
| 5,201,885 A * | 4/1993 | Wehler | ................. | F16G 13/16 59/900 |
| 5,335,349 A * | 8/1994 | Kutsch | ................. | F16G 13/16 375/257 |
| 5,373,956 A * | 12/1994 | Kaufer | ................. | H02B 1/50 220/4.28 |
| 5,509,099 A * | 4/1996 | Hermsen | ................. | G02B 6/4442 385/134 |
| 5,535,298 A * | 7/1996 | Fasnacht | ................. | G02B 6/4452 385/135 |
| 5,568,584 A * | 10/1996 | Smith | ................. | G02B 6/4446 385/134 |
| 5,613,029 A * | 3/1997 | Burek | ................. | G02B 6/4452 211/194 |
| 5,642,612 A * | 7/1997 | Hughes | ................. | F16L 3/237 59/78.1 |
| 5,711,144 A * | 1/1998 | Pea | ................. | F16G 13/16 59/900 |
| 5,724,803 A * | 3/1998 | Pea | ................. | F16L 3/01 59/900 |
| 5,783,776 A * | 7/1998 | Birmingham | ................. | F16L 5/08 174/657 |
| 5,787,219 A * | 7/1998 | Mueller | ................. | G02B 6/4447 385/134 |
| 5,825,961 A * | 10/1998 | Wilkins | ................. | H02G 15/013 385/135 |
| 5,835,658 A * | 11/1998 | Smith | ................. | H02G 15/007 385/136 |
| 5,883,333 A * | 3/1999 | Wambeke | ................. | H02G 15/013 174/92 |
| 5,990,420 A * | 11/1999 | Alexander | ................. | H02G 3/22 174/157 |
| 6,002,088 A * | 12/1999 | Ehmann | ................. | B60R 16/0215 174/152 G |
| 6,039,081 A * | 3/2000 | Albert | ................. | F16L 1/123 138/110 |
| 6,161,373 A * | 12/2000 | Heidrich | ................. | F16G 13/16 248/49 |
| 6,367,238 B1 * | 4/2002 | Fischer | ................. | F16G 13/16 59/78.1 |
| 6,539,161 B2 * | 3/2003 | Holman | ................. | G02B 6/4452 385/136 |
| 6,688,096 B2 * | 2/2004 | Wada | ................. | F16G 13/16 59/900 |
| 6,789,383 B1 * | 9/2004 | Plush | ................. | F16G 13/16 59/900 |
| 7,007,929 B2 * | 3/2006 | Kwon | ................. | H02G 1/04 226/190 |
| 7,082,852 B2 * | 8/2006 | Ikeda | ................. | F16G 13/16 59/78.1 |
| 7,132,602 B1 * | 11/2006 | Komiya | ................. | H02G 11/006 174/71 R |
| 7,205,481 B2 * | 4/2007 | Higbie | ................. | H02G 3/32 174/72 A |
| 7,243,486 B1 * | 7/2007 | Ikeda | ................. | H02G 11/006 248/51 |
| 7,441,397 B2 * | 10/2008 | Hart | ................. | F16G 13/16 248/51 |
| 7,806,374 B1 * | 10/2010 | Ehmann | ................. | H02G 3/22 248/67.5 |
| 7,882,690 B2 * | 2/2011 | Nehring | ................. | F16G 13/16 59/78.1 |
| 8,051,614 B1 * | 11/2011 | Peck | ................. | G02B 6/4459 52/220.8 |
| 8,220,243 B2 * | 7/2012 | Komiya | ................. | H02G 11/00 59/900 |
| 8,541,698 B2 * | 9/2013 | Perschon | ................. | H02B 1/305 174/152 G |
| 8,616,506 B2 * | 12/2013 | Milton | ................. | H02B 1/305 248/65 |
| 8,621,796 B2 * | 1/2014 | Egritepe | ................. | F16L 7/02 52/220.8 |
| 8,783,629 B2 * | 7/2014 | Even | ................. | F03D 80/85 248/68.1 |
| 8,806,847 B2 * | 8/2014 | Blase | ................. | F16G 13/16 59/900 |
| 8,891,928 B2 * | 11/2014 | Marmon | ................. | G02B 6/444 385/135 |

(56) References Cited

U.S. PATENT DOCUMENTS

| | | | | |
|---|---|---|---|---|
| 8,997,448 B2* | 4/2015 | Casadei | E02F 3/22 | 248/51 |
| 9,012,791 B2* | 4/2015 | Smith | H02G 3/22 | 174/664 |
| 9,496,692 B2* | 11/2016 | Sprenger | H02G 3/083 | |
| 9,751,219 B2* | 9/2017 | Kono | F16L 3/23 | |
| 9,803,721 B2* | 10/2017 | Glissman | H02G 11/00 | |
| 10,006,566 B2* | 6/2018 | Callahan | F16L 3/237 | |
| 10,371,182 B2* | 8/2019 | Milton | F16L 5/14 | |
| 10,574,048 B2* | 2/2020 | Nowastowski-Stock | H02G 3/22 | |
| 10,622,795 B2* | 4/2020 | Karlsson | A62C 3/16 | |
| 2003/0026647 A1 | 2/2003 | Sasaki | H02G 15/113 | 403/288 |
| 2003/0182924 A1* | 10/2003 | Tsutsumi | F16G 13/16 | 59/78.1 |
| 2004/0256138 A1* | 12/2004 | Grubish | H02G 3/22 | 174/93 |
| 2005/0115733 A1* | 6/2005 | Kreutz | F16L 5/02 | 174/652 |
| 2006/0070764 A1* | 4/2006 | Utaki | F16G 13/16 | 174/68.1 |
| 2006/0204198 A1* | 9/2006 | Michiels | G02B 6/4446 | 385/135 |
| 2006/0219421 A1* | 10/2006 | Kitagawa | F16G 13/16 | 174/19 |
| 2006/0219848 A1* | 10/2006 | Komiya | F16G 13/16 | 248/49 |
| 2007/0071544 A1* | 3/2007 | Komiya | F16G 13/16 | 403/13 |
| 2008/0105461 A1* | 5/2008 | King | H02G 3/081 | 174/535 |
| 2009/0121091 A1* | 5/2009 | Elm | H02G 3/22 | 248/57 |
| 2009/0315273 A1* | 12/2009 | Johansson | F16L 5/08 | 277/606 |
| 2011/0080078 A1* | 4/2011 | Perschon | H02B 1/305 | 312/293.1 |
| 2011/0114801 A1* | 5/2011 | Ehmann | H02G 3/083 | 248/68.1 |
| 2012/0096828 A1* | 4/2012 | Jaeker | H02G 11/006 | 59/84 |
| 2012/0134739 A1* | 5/2012 | Blase | F16G 13/16 | 403/6 |
| 2013/0026160 A1* | 1/2013 | Hu | H05K 5/069 | 220/3.3 |
| 2013/0212998 A1* | 8/2013 | Komiya | H02G 11/006 | 59/78.1 |
| 2013/0228657 A1 | 9/2013 | Sprenger et al. | | |
| 2013/0233615 A1* | 9/2013 | Pimentel | H02G 15/007 | 174/650 |
| 2013/0292157 A1* | 11/2013 | Sprenger | H02G 3/083 | 174/151 |
| 2014/0069904 A1* | 3/2014 | Sammons | H02G 15/113 | 219/136 |
| 2014/0083075 A1* | 3/2014 | Hughes | F16G 13/18 | 59/78.1 |
| 2014/0102070 A1* | 4/2014 | Daly | F16G 13/16 | 59/78.1 |
| 2014/0175231 A1* | 6/2014 | Cox | H02G 3/04 | 248/68.1 |
| 2014/0198458 A1* | 7/2014 | Carlson | H02G 15/007 | 361/728 |
| 2014/0377987 A1* | 12/2014 | Germain | H01R 13/5829 | 439/532 |
| 2015/0089917 A1* | 4/2015 | Jaeker | H02G 11/006 | 59/78.1 |
| 2015/0137461 A1* | 5/2015 | Coenegracht | H02G 15/04 | 277/618 |
| 2015/0159733 A1* | 6/2015 | Blase | F16G 13/16 | 59/78.1 |
| 2015/0211659 A1* | 7/2015 | Even | H02G 3/18 | 248/69 |
| 2015/0247591 A1* | 9/2015 | Goldwin | F16L 3/2235 | 248/67.5 |
| 2015/0316739 A1* | 11/2015 | Marmon | G02B 6/44 | 385/135 |
| 2015/0380919 A1* | 12/2015 | Aznag | H01R 31/06 | 174/564 |
| 2016/0053854 A1* | 2/2016 | Hermey | F16G 13/16 | 59/78.1 |
| 2016/0069421 A1* | 3/2016 | Hermey | H02G 11/006 | 59/78.1 |
| 2016/0149384 A1* | 5/2016 | Lu | F16L 3/015 | 59/78.1 |
| 2016/0170164 A1* | 6/2016 | Pasek | G02B 6/4471 | 385/136 |
| 2017/0232281 A1* | 8/2017 | Rakic | F16L 5/02 | 169/43 |
| 2017/0292588 A1* | 10/2017 | Hermey | H02G 11/006 | |
| 2017/0354836 A1* | 12/2017 | Lopes | F16L 5/04 | |
| 2018/0254621 A1* | 9/2018 | Coenegracht | H02G 15/10 | |
| 2019/0237901 A1* | 8/2019 | Schoenfeld | H01R 13/5208 | |
| 2019/0280427 A1* | 9/2019 | Reibel | H02G 15/007 | |
| 2019/0360555 A1* | 11/2019 | Hermey | F16G 13/16 | |
| 2020/0080666 A1* | 3/2020 | Rakic | E04B 1/947 | |
| 2020/0169072 A1* | 5/2020 | Ehmann | H02G 15/007 | |
| 2020/0287369 A1* | 9/2020 | Kaun | H02B 1/305 | |
| 2021/0328416 A1* | 10/2021 | Ehmann | F16L 5/14 | |
| 2021/0399537 A1* | 12/2021 | Ehmann | H02G 3/22 | |

FOREIGN PATENT DOCUMENTS

| | | | | | |
|---|---|---|---|---|---|
| DE | | 2417353 | A1 * | 10/1975 | F16G 13/16 |
| DE | | 29607172 | | 6/1996 | |
| DE | | 29703721 | | 4/1997 | |
| DE | | 29907444 | | 7/1999 | |
| DE | | 10004679 | A1 * | 8/2001 | F16G 13/16 |
| DE | 102005037561 | | A1 * | 5/2006 | F16G 13/16 |
| DE | 202006007155 | | | 7/2006 | |
| DE | 102006020754 | | | 11/2007 | |
| DE | 102006027258 | | A1 * | 12/2007 | F16G 13/16 |
| DE | 102011011868 | | A1 * | 8/2012 | H02G 15/007 |
| DE | 102014102790 | | A1 * | 9/2015 | H02G 3/22 |
| DE | 202017101483 | | | 3/2017 | |
| DE | 202017101483 | | U1 * | 3/2017 | F16G 13/16 |
| DE | 102018218426 | | A1 * | 4/2020 | H02G 3/22 |
| EP | | 1992839 | | 11/2008 | |
| EP | | 2746634 | | 6/2014 | |
| EP | | 2916409 | | 9/2015 | |
| GB | | 934771 | | 8/1963 | |
| GB | | 2484005 | A * | 3/2012 | H02G 3/22 |
| JP | | H11082816 | | 3/1999 | |
| JP | | 2004011803 | A * | 1/2004 | F16G 13/16 |
| JP | | 2004156673 | | 6/2004 | |
| JP | | 2012115098 | | 6/2012 | |
| JP | | 2013542587 | | 11/2013 | |
| SE | | 1551489 | A1 * | 5/2017 | H02G 3/22 |
| WO | WO-2021209819 | | A2 * | 10/2021 | F16G 13/16 |

OTHER PUBLICATIONS

English translation of International Search Report from corresponding PCT Appln. No. PCT/EP2018/059164, dated Jul. 12, 2018.
Office Action from related Japanese Appln. No. 2019-555149, dated Apr. 19, 2022. English translation attached.
Office Action from related Japanese Appln. No. 2019-555149, dated Oct. 25, 2022. English translation attached.
English translation of Office Action from related Korean Appln. No. 10-2019-7033093, dated Dec. 19, 2022.

* cited by examiner

STRAIN RELIEF FOR QUICK ASSEMBLY FOR A CABLE CARRIER

FIELD

The invention relates in general to a lead-through for orderly feedthrough of a plurality of supply lines, such as cables, hoses or the like, and in particular to such a lead-through that can be used as a strain relief for an energy chain.

BACKGROUND

Many designs of lead-throughs for individual lines are known, including with strain relieving function, for example in the form of cable bushings with compression fitting. The principle of individual linewise securing is also applied as strain relief for energy chains, see for example the collar bands for energy chains according to Utility Model DE 299 07 444 U1 belonging to the applicant.

If each line is secured individually, the strain relief can be optimally matched to each line, but assembly is very complex in this case, in particular where there is a relatively large number of different lines, as is conventional for example in the case of energy chains.

For the purposes of the present invention, a lead-through is therefore taken as generic which guides a plurality of optionally different types of supply line jointly in a desired arrangement through a assembly plane.

Such a cable clincher for general applications is described for example in EP 2 746 634 A1. In this case, making up is simplified by a retaining frame produced with snap connections. However, this solution can only absorb low tensile forces and is not suited, for example, to energy chains.

Utility model DE 296 07 172 U1 belonging to the applicant describes as lead-through for a plurality of lines a type of block clamp, which is suitable in particular as strain relief for an energy chain for hoses and which considerably simplifies making up.

A previously known, generic lead-through with strain relief for a plurality of lines is shown in appended FIG. 3. This is shown for example on page 1175 of the "igus E-Chains and E-Chain Systems Catalog 2015" belonging to the applicant igus GmbH and has proven effective. This lead-through according to FIG. 3 has a multipart, roughly rectangular retaining frame with two opposing horizontal rails (2, 5), namely a lower C rail (5) for fastening purposes and an upper clamping rail (2), which is tensioned relative to the C rail by means of a clamping device (3, 4). The rails (2, 5) are connected by side parts (1), namely a plurality of vertically stacked retaining blocks. In the assembled state, the retaining blocks (1) hold the two rails (2, 5) at a distance from one another and laterally further retain block-type spacers (6), here strain relief blocks with line-specific cut-outs in the clamping surfaces. The supply lines (not shown) are fed through between the spacers (6) retained in the retaining frame. In the known design according to FIG. 3, the clamping device for exerting a clamping force via the retaining frame, in particular the clamping rail (2), on the spacers (6) for the purpose of strain relief by force-locking securing of the lines to the spacers comprises two clamping bolts (3, 4), which engage with stud bolts in the C rail. The vertical pretensioning or clamping force which is exerted by the clamping rail (2) towards the C rail (5), i.e. on the spacers (6), is adjusted with threaded nuts of the clamping bolts (3, 4).

The principle of clamping rails with bolts as clamping devices has long been known, for example from GB 934,771 A, and is also described for example in DE 20 2006 007 155 U1 for strain relief in active line guidance arrangements. This principle allows high clamping forces to be achieved, in order, for example, to guarantee sufficient strain relief for each line even in the case of a relatively large number of lines.

The designs according to FIG. 3 have proven effective, but are very complex on the one hand with regard to making up, i.e. the final steps of assembly including feedthrough and securing of the lines, and on the other hand also when generating the clamping force for strain relief.

A further lead-through is described in DE 24 17 353 A1. This does not comprise an actual strain relief, but rather a specific connecting piece structure for connecting two link plates within the chain. Specific transverse connecting pieces are provided within the energy chain, with a retaining profile on which in each case a resiliently deformable clamping lip is arranged. This construction is not straightforwardly suitable for strain relief at the ends of the lines.

SUMMARY

A first object of the present invention is therefore to propose a lead-through for a plurality of supply lines which simplifies making up. Simplified adjustment or production of strain relief action can then in particular also be provided.

In a particularly simple embodiment according to a first aspect, this object is achieved for a lead-through if the clamping device has at least one quick-release clamp, which in its closed position clamps together the side parts and/or the rails in order to exert clamping force on the spacers and in its open position releases or opens up the spacers for insertion or removal of lines.

In this way, in particular the assembled state, in which the frame parts are firmly connected together, may also be achieved by the quick-release clamp, i.e. the quick-release clamp serves in particular also to fasten the rails and side parts or transverse parts. Consequently also opening for subsequent modification of the line arrangement or to replace lines, for example in the case of maintenance, may proceed easily using the at least one quick-release clamp. At the same time, the quick-release clamp also generates the clamping force for force-locking fastening or securing against tensile forces of the supply lines to the spacers.

Various per se known models of quick-release clamps are feasible, for example a circumferential clamping or collar band with a clamping plate and a quick-release closure.

In one preferred embodiment, however, provision is made for the clamping device to comprise two quick-release lever-action clamps, which are each mounted at one of the two end regions of the first rail and cooperate with the side parts arranged transversely of the rails.

In one preferred further development, two one-piece side parts are provided as side parts, these connecting the rails and being capable of transferring tensile force from the first rail to the second rail.

A particularly preferred embodiment provides for one end region of each of the two side parts to be mounted swivelably on the second rail and for the other end region to cooperate with in each case one of the two quick-release clamps. In this construction, each transverse part may be swiveled by the respective quick-release clamp into the closed position, i.e. the side parts, once swiveled shut, exert the clamping force on the spacers and the lines. This design is particularly easy to handle and also still retains to a degree the function of a frame even when open, so that the frame and the released spacers do not fall apart. In addition, depending on the position of the center of rotation and the length of the side parts, an additional lever action may be obtained for the clamping force.

In this case, the second rail may be embodied as a stationary base for the quick-release clamp mechanism and optionally also for fastening the retaining frame.

Alternatively, however, as in the prior art, the clamping force may also be achieved by rails pulled parallel towards one another. This may also be achieved with two quick-release clamps, e.g. if the second rail is embodied as a stationary base, optionally also for fastening of the retaining frame, and the first rail is clamped via the side parts into the closed position against the second rail by means of the two quick-release clamps. This also constitutes a simplification over known clamping bolts and avoids overtightening thereof.

In a particularly preferred further development of the invention, two quick-release clamps embodied as toggle lever clamps are provided as the clamping device, these clamps preferably being arranged symmetrically on the retaining frame and exerting symmetrical clamping forces at two sides onto the side parts or the first rail.

A toggle lever clamp allows a relatively high clamping force to be generated by manual actuation with little force and without use of an additional tool. In addition, inherent locking in a desired closed position may be provided, in order to exert a predetermined force. Arranging two toggle lever clamps on the retaining frame simplifies more even force distribution over the multiple lines.

In one mechanically favorable embodiment, each toggle lever clamp has a clamping arm, with a first end region shaped as a retaining claw and a second end region mounted swivelably on the first rail by means of a hinged yoke. The hinged yoke here defines a first swivel axis at the first rail and a second swivel axis at the clamping arm. The retaining claw may define the third swivel axis in the form of a retaining pin on the transverse part. The hinged yokes preferably define two swivel axes perpendicular to the assembly plane, in order to generate clamping forces extending as exactly as possible in the assembly plane, i.e. clamping forces substantially perpendicular to the feedthrough direction of the lines. In this case, all the hinge joint or swivel connections may be embodied so as to be releasable, in particular the swivel yoke may be mounted releasably on the first rail and/or the clamping arm may be mounted releasably on the swivel yoke to simplify removal and attachment of least one frame part. All the swivel axes may extend perpendicular to the assembly plane, inter alia to ensure frame stability in the assembly plane.

In a preferred further development, provision is made for the first rail to be embodied as a profile rail, with a receptacle open to the outside for the two toggle lever clamps to be folded down into a locked position. In this way, each toggle lever clamp may be substantially folded down into the first rail, in particular if the toggle lever clamp has been swiveled beyond the dead center position of the toggle lever clamp (i.e. if the three swivel axes lie in a plane or all the points of rotation lie on a straight line). This prevents parts of the toggle level clamp from projecting in a troublesome way in operation and reduces the risk of unintended opening of the toggle lever clamp, for example if the clamping arm were to snag onto another object.

In a particularly simple embodiment according to a second aspect, the object is achieved for a lead-through in that with their first end region the two side parts are mounted swivelably on the second rail and with their other end region they cooperate in each case with the first rail for the purpose of releasable fastening, such that each side part may be swiveled from the closed position into an open position, in which the spacers are released for insertion or removal of lines. This allows easy access for insertion or removal of lines and also simplified assembly, with or without a quick-release clamp.

In one embodiment, the first rail may be bolted at each end to one of the two side parts. Thus, thanks to the swivelable side parts, the first rail can be folded open and shut together with one side part after release of just one bolted connection, i.e. the bolted connection to the other side part, without a tool and without any further step.

Preferably, each side part has a swivel opening at the first end region, by means of which it is retained releasably on a swivel pin at the end of the second rail and is mounted swivelably thereon.

The swivel axes of the side parts, for example defined by swivel openings and swivel pins, are preferably parallel to the feedthrough direction or transverse of the assembly plane or main plane of the retaining frame. The side parts thus swivel in the assembly plane on swiveling open and shut.

In the closed position, the side parts in particular may exert a clamping force on the spacers for the purpose of strain relief of lines to be fed through. In this case, in the closed position the side parts bring about a clamping force substantially perpendicular to the feedthrough direction and parallel to the rails. The rails may also achieve a degree of clamping action by means of the bolted connection. However, the primary clamping action is preferably achieved by swiveling shut of the side parts relative to one another. In this way, use may additionally be made of a lever action.

In one embodiment, the first rail has at its end at least one feedthrough sleeve projecting perpendicular to the longitudinal extent thereof for a bolt, which may be inserted into a matching receptacle in each side part. The first rail may thus perform its engaging or retaining function immediately after being swiveled shut, such that clamping force is already achieved between the side parts even before bolting takes place.

As an alternative to the bolted connection, the first rail may also be secured by other connections to the side parts, for example by means of snap-in connectors or other force- and/or form-locking connections, in particular also by means of quick-release clamps (see above).

Irrespective of the aspect in question, a number of spacers are preferably provided which are resiliently deformable and secure the lines in force-locking manner in the assembly plane when the closed position of the clamping device is reached. The desired clamping force may in this case be predetermined by way of the characteristics of the spacers.

In this respect, with the proposed closure on the retaining frame, the spacers may be arranged with their longitudinal extent horizontal, as usual, but now in particular vertical in the retaining frame, which further facilitates making up. The retaining frame may in particular consist of four main parts, two rails and two side parts, which in the closed position form a substantially quadrilateral frame in the assembly plane.

To achieve suitable clamping forces with different line diameters, relatively flexible spacers are preferably used in the form of elongate clamping parts with opposing clamping surfaces. The resilience or deformability may in particular be achieved with a honeycomb-like cavity structure between the clamping surfaces, as disclosed in Utility Model DE 20 2017 101 483, the teaching of which is incorporated herein by reference.

Likewise shown in greater detail in DE 20 2017 101 483 is the end fastening of an energy chain with two end fastening plates. The lead-through according to one of the above embodiments may in this case be used as strain relief. The lead-through is thus also in particular suitable as strain relief for an energy chain, i.e. for active line guidance for guiding lines between points movable relative to one another, in particular but not exclusively in maintenance-intensive industrial machinery.

The lead-through may be fastened to the end fastening plates by bolted connection and/or by form-locking connection. Clamping jaws are preferably arranged on each side part, these engaging in the end fastening plates in the closed position for form-locked fastening and securing the lead-through thereto. In this way, fastening of the lead-through may at the same time proceed using the quick-release clamp.

Preferred features of the two aspects may be combined.

BRIEF DESCRIPTION OF THE DRAWINGS

Further advantages and features of the invention are revealed by the appended drawings, on the basis of which preferred exemplary embodiments of the invention are explained below without restricting the general nature of the above description. Structurally or functionally identical elements are labeled with the same reference signs in the figures, in which.

DETAILED DESCRIPTION

Figures 1A, 1B:
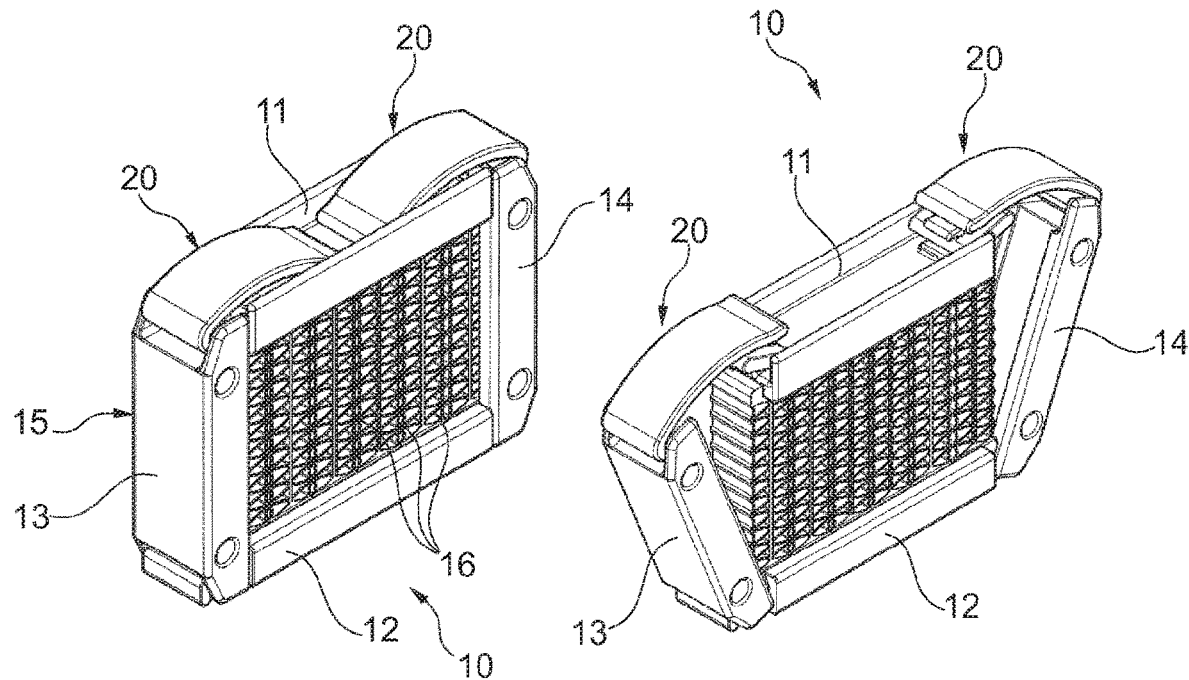
FIGS. 1A-1B show perspective views of a lead-through designed as strain relief for an energy chain for a plurality of lines and with a clamping device, in a closed position (FIG. 1A) and an open position (FIG. 1B)
Figure 2A:
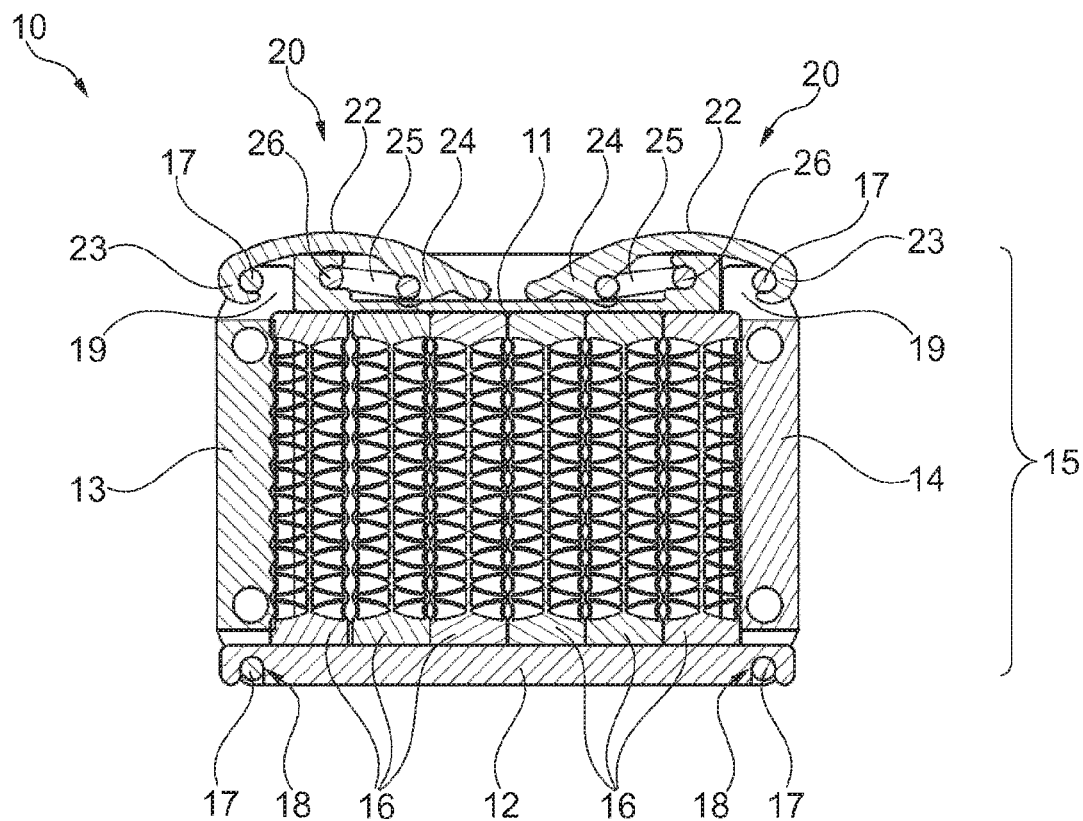
FIGS. 2A-2B show vertical sections through the lead-through of FIG. 1, in a closed position (FIG. 2A) and an open position (FIG. 2B)
Figure 2B:
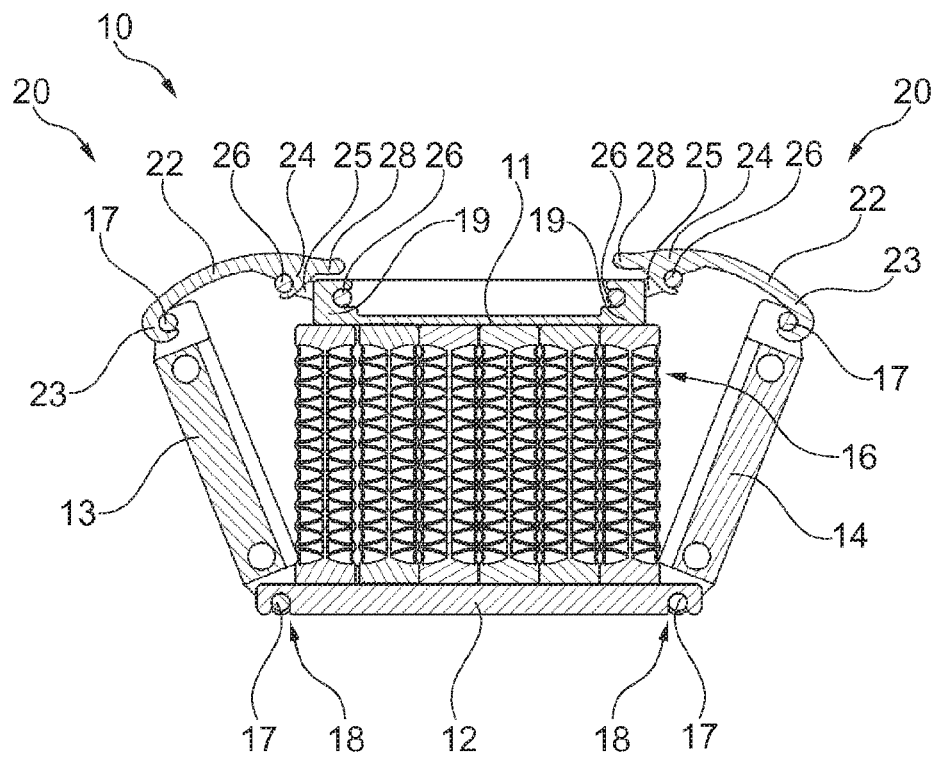

FIGS. 1-2 show a strain relief 10 for the feedthrough of supply lines (not shown) at the end of an energy chain (not shown). The strain relief 10 substantially consists of four frame parts and the spacer 16 received therein, namely an upper first rail 11, a lower second rail 12 and two side parts 13, 14 of identical structure. The rail parts 11, 12 and the side parts 13, 14 form a rectangular retaining frame 15 which retains the spacers 16 when the retaining frame 15 is closed or assembled. The side parts 13, 14 in this case keep the two rails 11, 12 parallel and spaced. The supply lines, not shown in any greater detail here, are fed through between the individual spacers 16, substantially perpendicular to the plane of FIGS. 2A-2B, i.e. the spacers 16 serve as strain relief blocks.

In order, using the retaining frame 15 and spacers 16, to exert force in the closed position on lines that have been fed through, a clamping device consisting of two toggle lever clamps 20 is incorporated into the retaining frame 15. The two toggle lever clamps 20 serve as quick-release clamps and ensure strain relief in the closed position (FIG. 1A or FIG. 2A) by applying clamping force to the spacers 16. On the other hand, the toggle lever clamps 20 allow easy release of the spacers 16 and lines fed therethrough. The toggle lever clamps 20 are of identical construction and arranged in mirror-symmetrical manner.

The two side parts 13, 14 are produced in one piece, for example as injection-molded plastics parts, and connect the two rails 11, 12. The side parts 13, 14 may here be of mirror-symmetrical construction relative to a horizontal [plane]. The side parts 13, 14 have two cylindrical retaining pins 17 serving as swivel axis. The retaining pins 17 are each provided perpendicular to the longitudinal extent, in one of the two exposed end regions of each side part 13, 14. In the second rail 12, the lower retaining pins 17 engage releasably from behind in a swivel opening 18 and are thus releasably connected with the second rail 12. The retaining pins 17 form in the swivel openings 18 a hinge joint swivelable in the assembly plane (FIGS. 2A-B) for swiveling the side parts 13, 14 open and shut. The rails 11, 12 may also be produced as injection-molded plastics parts.

Each toggle lever clamp 20 has a clamping arm 22 and is preferably produced as an injection-molded part. Each toggle lever clamp 20 has a first end region shaped as a retaining claw 23 or retaining hook. Each retaining claw 23 engages releasably behind the upper retaining pin 17 of one side part 13, 14. At the other end region, the clamping arm 22 has a holder 24, which forms a swivel bearing. By means of the holder 24, the clamping arm 22 is locked firmly, at least captively, but rotatably to a hinged yoke 25. The hinged yoke 25 may in this case be embodied for example in the manner of a C clip or as a fully continuous yoke in the manner of a closed ring and is produced from deformation-resistant material. The hinged yoke 25 forms two cylindrical swivel pins 26, which serve as axes of rotation. The one swivel pin 26 is engaged in the holder 24 of the clamping arm 22. The other, opposing swivel pin 26 engages releasably behind a swivel holder 19 of the first rail 11. Each swivel holder 19 is formed at the respective end region of the first rail 11 as a cross-sectionally C-shaped bearing receptacle, preferably in one piece with the rail 11. The swivel holder 19 is open towards the inside and allows easy release of the hinged yoke 25 from the first rail 11. The retaining pin 17, the swivel holder 19 and the swivel pin 26 of the hinged yoke 25 are in this case arranged with an axis of rotation perpendicular to the assembly plane (=plane of the drawing in FIGS. 2A-2B).

The releasability of the retaining pins 17 or the swivel holder 19, which is most easily visible in FIG. 2, enables the frame parts, i.e. the rail parts 11, 12 and the side parts 13, 14, to be readily assembled and also readily disassembled. In this way, in particular, access to the spacers 16 and the supply lines therebetween is also simplified.

As is most readily apparent from FIGS. 1B-2B, the first rail 11 takes the form of a profile rail with a receptacle open to the outside, into which a major part of the two toggle lever clamps 20 is folded down in the closed position. The shaping of the clamping arm 22 is here selected such that in the closed position said arm engages beyond the dead center position (=position in which the axes of rotation of the upper retaining pin 17 and of the two swivel pins 26 align) into a locking position. For ease of opening, at its inner end region the clamping arm 22 has an actuating tab 28 curved appropriately backwards, which tab may be used for manual unlocking.

On the inside, all the frame parts 11, 12, 13, 14 preferably have a receiving profile, e.g. in the form of a groove, matching the thickness of the spacers 16 for retaining the spacers 16 or strain relief blocks. The spacers 16 are preferably resiliently deformable in order to secure the lines in force-locking manner. In this respect, the modular construction of the spacers 16 according to Utility Model DE 20 2017 101 483 is particularly preferred, i.e. with a cavity structure between the lateral clamping surfaces for the lines. However, conventional, tailor-made strain relief blocks according to FIG. 3 may also be used, for example of polyurethane.

To fasten the retaining frame 15, bolt holes may for example be provided perpendicular to the assembly plane in the two structurally identical side parts 13, 14, for bolted connection with end fastening plates of an energy chain (not shown). Alternatively and/or in addition, the lower rail 12 may have fastening means similar to the known C rail for fastening the retaining frame 15 to an energy chain. For simplicity's sake, the disclosure of DE 20 2017 101 483 is incorporated herein by reference, in particular with regard to the spacers 16 and the end fastening of an energy chain.

Figure 4A:
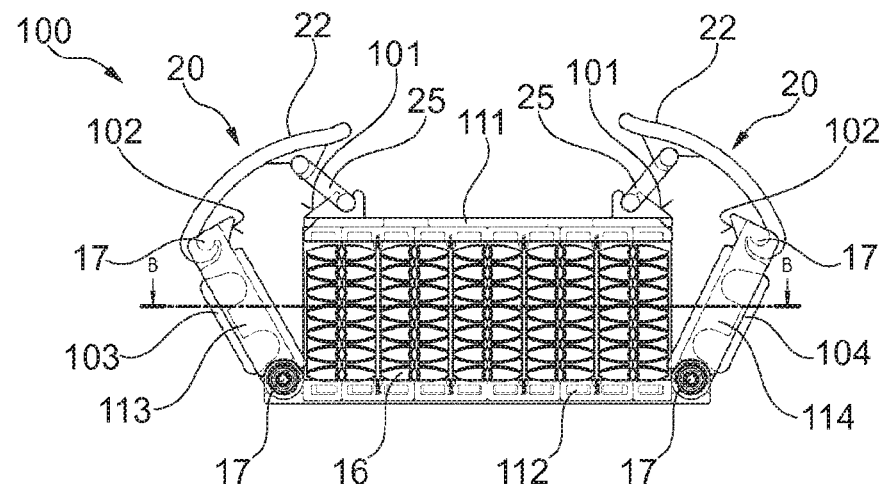
FIGS. 4A-4B show a vertical section (FIG. 4A) and a horizontal section (FIG. 4B) along line B-B of a second exemplary embodiment of a lead-through as strain relief at the end fastening link of an energy chain.
Figure 4B:
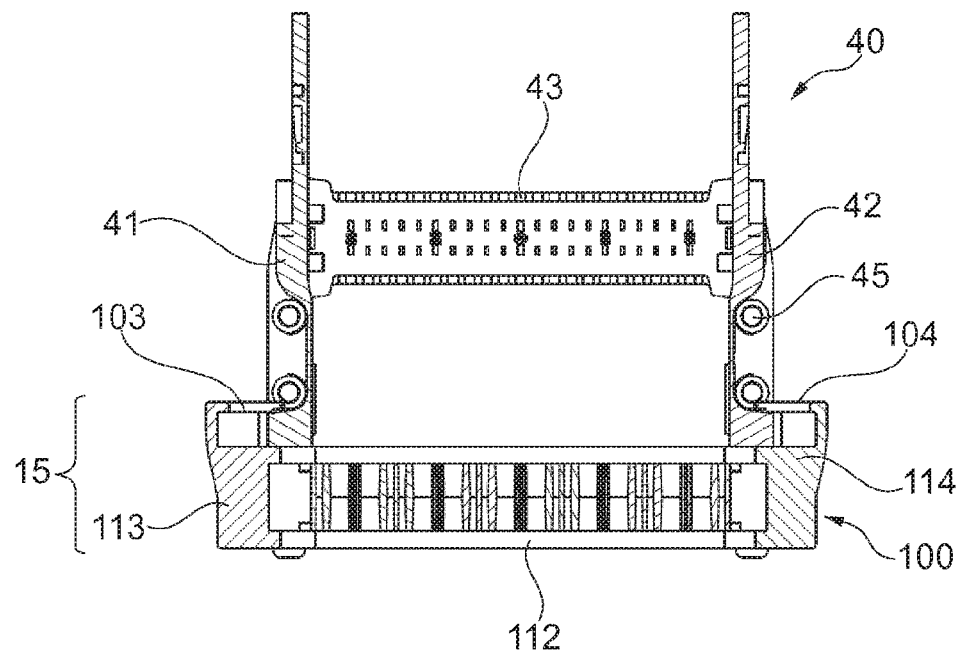

FIGS. 4A-4B show a further variant of a lead-through 100, which serves as a strain relief at the end fastening 40 of an energy chain. In a per se known construction, the end fastening 40 has two mirror-symmetrical end fastening plates 41, 42, which are configured for hinged connection with a chain link (not shown). The end fastening plates 41, 42 are made of plastics and held together in parallel via transverse connecting pieces 43. Both end fastening plates 41, 42 have frame regions with inserted threaded bushes 45 of metal for bolting to the mobile or stationary connection region.

The lead-through 100 in FIGS. 4A-4B differs substantially at two points from FIGS. 1-2, with regard to the construction of the two side parts 113, 114 and of the first rail 111. For securing in the longitudinal direction of the chain or perpendicular to the assembly plane, the side parts 113, 114 have clamping jaws 103, 104 molded on in one piece and shaped so as to fit in a previously known configuration with a recess present in any event in the frame regions of the end fastening plates 41, 42. As is apparent from FIGS. 4A-4B, the clamping jaws 103, 104 engage, when in the closed position (FIG. 4B), in the end fastening plates 41, 42 for form-locking fastening and thereby clamp the retaining frame 15 thereagainst. Accordingly, the side parts 113, 114 are here mirror-symmetrical. A further difference consists in cooperating set bevels 101 on the first rail 111 and set bevels 102 on the side parts 113, 114, which in the closed position (FIG. 4B), in addition to the horizontal clamping force from the toggle level clamps 20, also exert an additional vertical contact force between first rail 111 and second rail 112 on the spacers 16.

The construction of the quick-release clamps 20 is here in principle identical to that in FIGS. 1-2. The clamping arm 20 and the swivel yokes 25 are also made of dimensionally stable, torsion-resistant material, for example of metal or reinforced plastics or a combination thereof.

The quick-release closure according to the invention appreciably simplifies optional making up of a lead-through. However, the solutions offered are in particular not exclusively suitable as strain relief for energy chains.

FIGS. 5A-5D show a third variant of a lead-through or strain relief 200 for an energy chain (cf. FIG. 6A), in particular according to an independent second aspect of the invention. The strain relief 200 has a four-part retaining frame 215 of two parallel opposing horizontal rails 211, 212, and two vertical side parts 213, 214. A number of block-type spacers 16 are retained in the retaining frame 215. A plurality of lines, such as cables, hoses or the like, may be inserted and clamped between each pair of vertical spacers 16. Spacers 16 with a honeycomb structure according to Utility Model DE 20 2017 101 483 may also be used here. At the two narrow sides, the spacers 16 have projections with which they are retained in form-locked manner against tensile forces in internal longitudinal recesses in the profile-like rails 211, 212. In the closed position, the retaining frame 215 generates a clamping force on the spacers for the purpose of strain relief of lines to be fed through, in particular in the horizontal direction by way of the side parts.

To simplify use, the two side parts 213, 214 are each mounted swivelably with their first end region on the second rail 212. At the other end region, the two side parts 213, 214 are each bolted together with the first rail 211 by a bolt 235 and to this end have for example a suitable internal thread or an internal receptacle for a threaded nut (not shown).

Figure 5A:
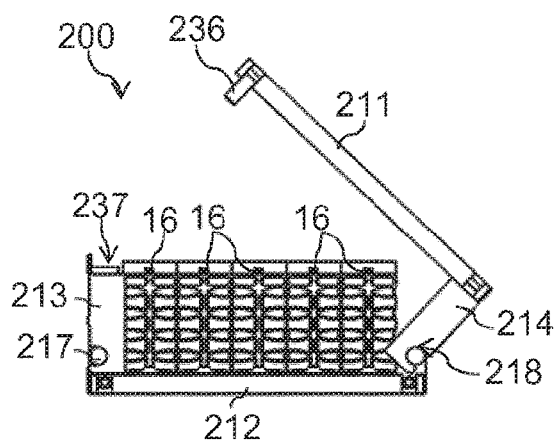
FIGS. 5A-5D show views of a third exemplary embodiment of a strain relief device for an energy chain in an open position (FIGS. 5A and 5C) and in a closed position (FIGS. 5B and 5D)
Figure 5B:
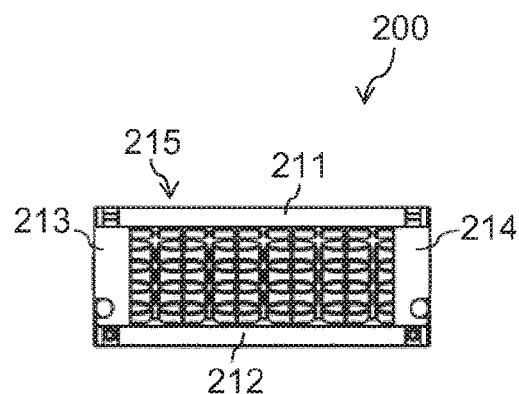
Figure 5C:
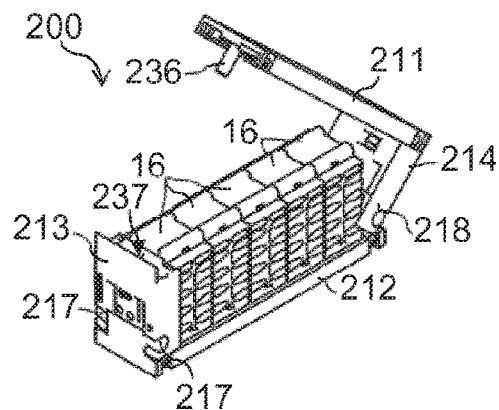
Figure 5D:
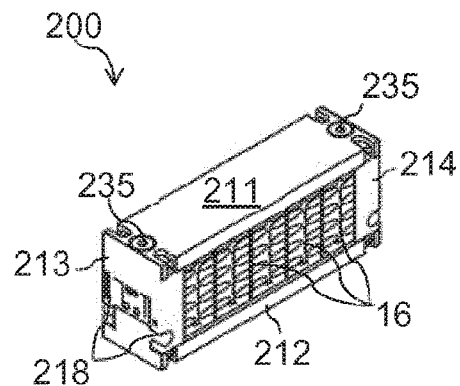

In FIGS. 5A-5D, each side part 213, 214 has at the end an inwardly open swivel opening 218 which cooperates in a releasable and swivelably mounted manner with longitudinally protruding swivel pins 217 of the second rail 212. The swivel axis in this case is h perpendicular to the assembly plane or main plane defined by the retaining frame 215. In this way, each side part 213, 214 is able to swivel into an open position to release spacers 16 or lines. As illustrated by FIG. 5A or FIG. 5C, after release of just one of the bolts 235 the first rail 211 may be folded open and shut together with the other side part 213, 214. In the open position according to FIG. 5A or 5C, the spacers 16 are not shown spread open, since here as yet no lines have been inserted; the other side part 213 also optionally folds outwards. In the closed position, clamping force parallel to the rails 211, 212 is brought about mainly by the side parts 213, 214.

The first rail 211 has at each end a feedthrough sleeve 236 protruding perpendicular to the longitudinal extent thereof for aligning the bolt 235, which fits into a vertical receptacle 237 in the side part 213 or 214 respectively, such that the rail 211 in FIGS. 5-6 can also be closed quickly even before bolting together proceeds by means of the bolt 235.

Figure 6A:
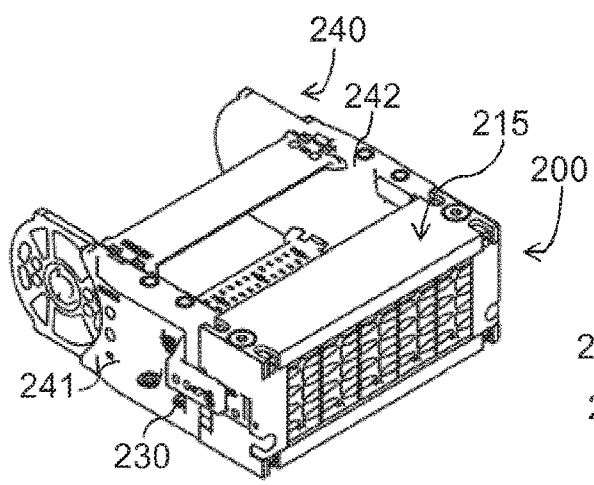
FIGS. 6A-6B show a strain relief device according to FIGS. 5A-5D, with retaining clips (FIG. 6B) for fastening to the end fastening link of the energy chain (FIG. 6A).
Figure 6B:
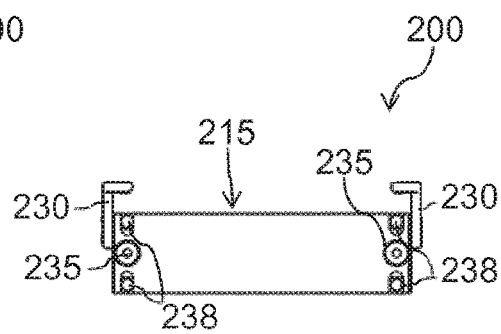

In the example according to FIGS. 6A-6B, the side parts 213, 214 have central recesses on the outside for form-locked retention of an optional retaining clip 230. The retaining clip 230 retains the frame 215 and thus the strain relief 200 at end fastening plates 241, 242 of the end fastening 240 of an energy chain (FIG. 6A), in a manner similar to FIG. 4. To this end, every retaining clip 230 engages in the closed position in form-locked manner in an end fastening plate 241, 242. FIG. 6B further shows four vertical through-bolt-openings 238, arranged at the corners, in the side parts 213, 214 and optionally the rails 211, 212 in order to be able to fasten the lower rail 212 from above by means of bolts or for assembly and disassembly, also with a closed retaining frame 215.

The rails 211, 212 may take the form of aluminum profile rails and optionally be embodied as interchangeable components optionally with add-on parts for swivel mounting. The side parts 213, 214 are interchangeable components and preferably injection-molded plastics parts. The retaining frame 215 is thus symmetrical or laterally interchangeable and can be folded open equally well on either side, cf. FIG. 5A. As in FIGS. 1-4, the retaining frame 215 consists of rigid parts 211, 212; 213, 214 which are robustly embodied, in particular with torsion-resistant cross-sectional profile.

The retaining frames 15; 215 according to both concepts (FIGS. 1-4 and FIGS. 5-6) allow a significant time saving with regard to assembly (and disassembly for maintenance). Combined with honeycomb-like spacers or clamping blocks 16, the most varied lines may furthermore be inserted together in one layer.

LIST OF REFERENCE SIGNS

Figure 3:
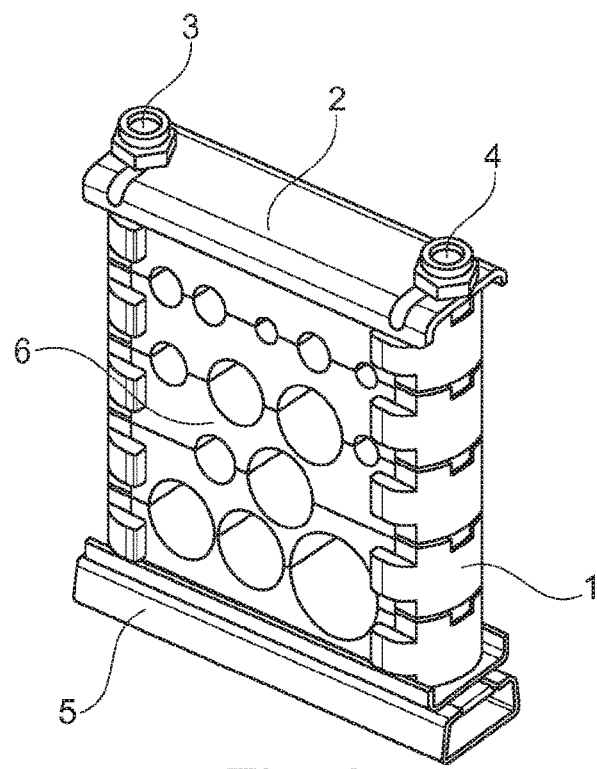
FIG. 3 shows a strain relief known in the art of the "strain relief connector system" type, from igus GmbH.

FIGS. 1-2:
10 Strain relief
11, 12 Rails
13, 14 Side parts
15 Retaining frame
16 Spacer (strain relief blocks)
17 Retaining pin
18 Swivel opening
19 Swivel holder
20 Toggle lever clamp
22 Clamping arm
23 Retaining claw
24 Holder
25 Hinged yoke
26 Swivel pin
28 Actuating tab
FIG. 3 (Prior Art):
1 Side parts (retaining blocks)
2, 5 Rails (clamping rail & C rail)
3, 4 Clamping bolts
6 Strain relief blocks
FIG. 4:
15 Retaining frame
16 Spacer (strain relief block)
17 Retaining pin
20 Toggle lever clamp
22 Clamping arm
25 Hinged yoke
40 End fastening
41, 42 End fastening plates
43 Transverse connecting piece
45 Threaded bushes
100 Strain relief
103, 104 Clamping jaw
111, 112 Rails
113, 114 Side parts
FIGS. 5-6:
16 Spacer (strain relief block)
200 Strain relief
211, 212 Rails
213, 214 Side parts
215 Frame
217 Swivel pin
218 Swivel opening
230 Retaining clip
235 Bolt
236 Feedthrough sleeve
237 Receptacle
238 Bolt openings
241, 242 End fastening plates
240 End fastening

What is claimed is:

1. A strain relief for a plurality of lines, comprising:
a first rail and an opposing second rail, which are connected by side parts, wherein the first and the second rail and the side parts form in a closed position a retaining frame in an assembly plane;
a plurality comprising more than two block-type spacers, which are retained in the retaining frame and between which a plurality of lines, such as cables or hoses, is feedable through in a feedthrough direction, the feedthrough direction and assembly plane being substantially transverse to each other;
the retaining frame in the closed position exerting clamping force on the block-type spacers via the side parts to provide strain relief of lines to be fed through;
wherein a first end region of each of the side parts is mounted swivelably on the second rail and a second end region cooperates in each case with the first rail for releasable fastening, such that each side part is swivelable from the closed position into an open position, in which the block-type spacers are released for insertion or removal of lines;
wherein each side part has a swivel opening at the first end region, by which it is retained releasably on a respective swivel pin at an end of the second rail and is mounted swivelably thereon, wherein the swivel opening and the swivel pin define a swivel axis parallel to the feedthrough direction;
wherein the block-type spacers are embodied as elongate clamping parts with opposing clamping surfaces and arranged in the retaining frame with their clamping opposing surfaces transverse to the rails;
wherein in the closed position the side parts are arranged to bring about a clamping force perpendicular to the feedthrough direction and parallel to the rails; and
wherein the first rail is connectable on both sides with each of the side parts via bolted connection, such that the first rail is suitable to be flipped open and shut together with one of the side parts after release of a bolted connection at another one of the side parts.

2. The strain relief as claimed in claim 1, wherein at least the first rail has at its end at least one perpendicular sleeve projecting perpendicular to a longitudinal extent thereof for a bolt, which is insertable into a respective matching receptacle in each side part.

3. The strain relief as claimed in claim 1, wherein the block-type spacers are resiliently deformable and in the closed position secure the lines in force-locking manner in the assembly plane.

4. The strain relief as claimed in claim 3, wherein the block-type spacers are arranged with a longitudinal extent thereof vertical in the retaining frame.

5. An end fastening for an energy chain, comprising two end fastening plates and comprising a strain relief as claimed in claim 1, wherein the strain relief is bolted together with the end fastening plates by fastening holes, in the side parts, in a direction perpendicular to the assembly plane and/or has a clamping jaw or a retaining clip on each side part, for form-locking engagement in the end fastening plates in the closed position.

6. An energy chain having a strain relief as claimed in claim 1, said strain relief arranged at an end of the energy chain.

7. An energy chain comprising end fastening plates forming an end of the energy chain and comprising a strain relief for a plurality of lines, wherein the strain relief is arranged adjacent to the end fastening plates and the retaining frame being held in position together with the end fastening plates and at a terminal end thereof, the strain relief comprising:
a first rail and an opposing second rail, which are connected by side parts, wherein the first and the second rail and the side parts form in a closed position a retaining frame in an assembly plane;

at least two block-type spacers, which are retained in the retaining frame and between which a plurality of lines, such as cables or hoses, is feedable through in a feedthrough direction, the feedthrough direction and assembly plane being substantially transverse to each other;

the retaining frame in the closed position exerting clamping force on the block-type spacers via the side parts and/or the rails to provide strain relief of lines to be fed through;

wherein a first end region of each of the side parts is mounted swivelably on the second rail and a second end region cooperates in each case with the first rail for releasable fastening, such that each side part is swivelable from the closed position into an open position, in which the block-type spacers are released for insertion or removal of lines, wherein each side part has a swivel opening at the first end region, by which it is retained releasably on a respective swivel pin at an end of the second rail and is mounted swivelably thereon, wherein the swivel opening and the swivel pin define a swivel axis parallel to the feedthrough direction.

8. An end fastening for an energy chain, comprising two end fastening plates and comprising a strain relief, wherein the strain relief comprises:

a first rail and an opposing second rail, which are connected by side parts, wherein the first and the second rail and the side parts form in a closed position a retaining frame in an assembly plane;

a plurality comprising more than two block-type spacers, which are retained in the retaining frame and between which a plurality of lines, such as cables or hoses, is feedable through in a feedthrough direction, the feedthrough direction and assembly plane being substantially transverse to each other;

the retaining frame in the closed position exerting clamping force on the block-type spacers via the side parts to provide strain relief of lines to be fed through;

wherein a first end region of each of the side parts is mounted swivelably on the second rail and a second end region cooperates in each case with the first rail for releasable fastening, such that each side part is swivelable from the closed position into an open position, in which the block-type spacers are released for insertion or removal of lines;

wherein each side part has a swivel opening at the first end region, by which it is retained releasably on a respective swivel pin at an end of the second rail and is mounted swivelably thereon, wherein the swivel opening and the swivel pin define a swivel axis parallel to the feedthrough direction;

wherein the block-type spacers are embodied as elongate clamping parts with opposing clamping surfaces and arranged in the retaining frame with their clamping opposing surfaces transverse to the rails;

wherein in the closed position the side parts are arranged to bring about a clamping force perpendicular to the feedthrough direction and parallel to the rails; and wherein the strain relief is bolted together with the end fastening plates by fastening holes, in the side parts, in a direction perpendicular to the assembly plane and/or has a clamping jaw or a retaining clip on each side part, for form-locking engagement in the end fastening plates in the closed position.

\* \* \* \* \*